United States Patent
Adamy et al.

(10) Patent No.: US 7,054,846 B1
(45) Date of Patent: May 30, 2006

(54) TEMPORALLY DISCRETE DYNAMIC FUZZY LOGIC CONTROL ELEMENTS

(75) Inventors: Jürgen Adamy, Rossdorf (DE); Armin Yousif, Nürnberg (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 09/485,445

(22) PCT Filed: Jul. 29, 1998

(86) PCT No.: PCT/DE98/02163

§ 371 (c)(1),
(2), (4) Date: Feb. 11, 2000

(87) PCT Pub. No.: WO99/08163

PCT Pub. Date: Feb. 18, 1999

(30) Foreign Application Priority Data

Aug. 11, 1997 (DE) ................................ 197 34 711

(51) Int. Cl.
*G06N 7/02* (2006.01) M

(52) U.S. Cl. .............................. 706/1; 700/37; 700/41 M

(58) Field of Classification Search .................... 706/1; 700/37, 41, 45, 48
See application file for complete search history.

(56) References Cited

U.S. PATENT DOCUMENTS

| | | | | |
|---|---|---|---|---|
| 4,903,192 A | * | 2/1990 | Saito et al. | 700/37 |
| 5,135,688 A | * | 8/1992 | Nakamura et al. | 264/40.6 |
| 5,173,224 A | * | 12/1992 | Nakamura et al. | 264/40.6 |
| 5,245,529 A | * | 9/1993 | Hiroi | 700/41 |
| 5,272,428 A | * | 12/1993 | Spiegel et al. | 318/803 |
| 5,272,621 A | | 12/1993 | Aoki | 700/45 |
| 5,410,470 A | * | 4/1995 | Yamaoka et al. | 700/45 |
| 5,471,381 A | * | 11/1995 | Khan | 700/48 |
| 5,598,304 A | * | 1/1997 | Choi et al. | 360/78.04 |

FOREIGN PATENT DOCUMENTS

| | | |
|---|---|---|
| DE | 44 20 800 A1 | 12/1995 |
| WO | WO 96/31304 | 10/1996 |

* cited by examiner

*Primary Examiner*—Wilbert L. Starks, Jr.
(74) *Attorney, Agent, or Firm*—Venable LLP; Robert Kinberg

(57) ABSTRACT

A control unit has at least one control element, in particular with at least one integrating and/or differentiating transfer characteristic which is constructed as a temporally discrete dynamic fuzzy logic control element. A temporally discrete dynamic fuzzy logic control element of this kind is for example a so-called fuzzy logic automaton, which has processing states. It is advantageous that the control unit of the invention can be constructed with control elements that each have systematically dynamic fuzzy logic properties, and in which nonlinearities can be introduced in a targeted way for a desired control performance.

12 Claims, 6 Drawing Sheets

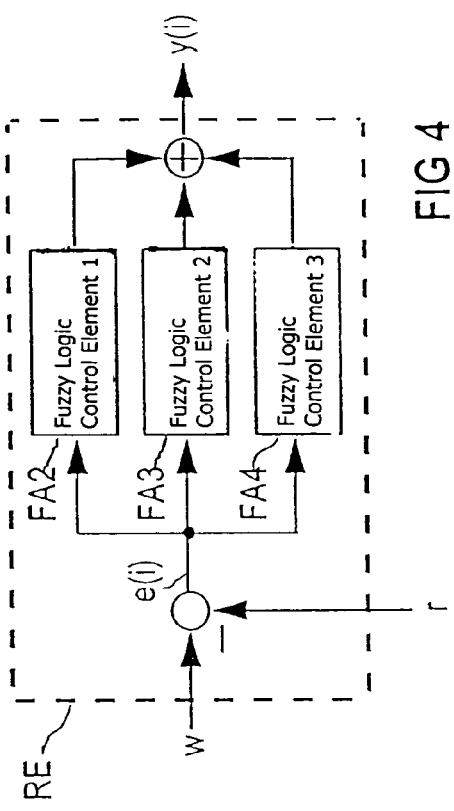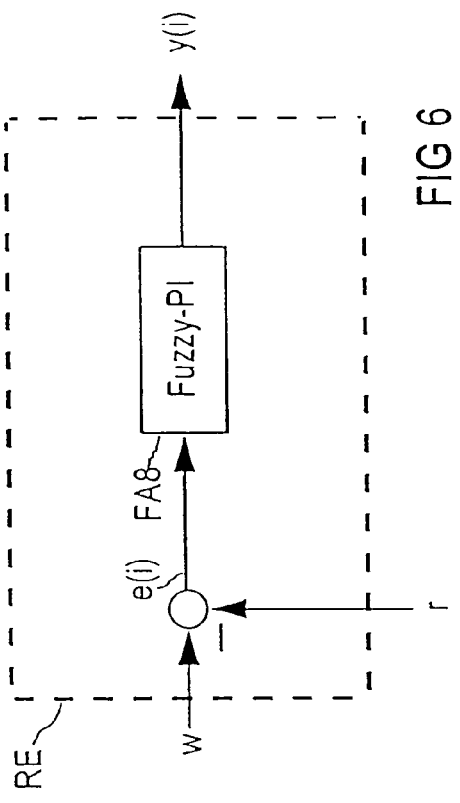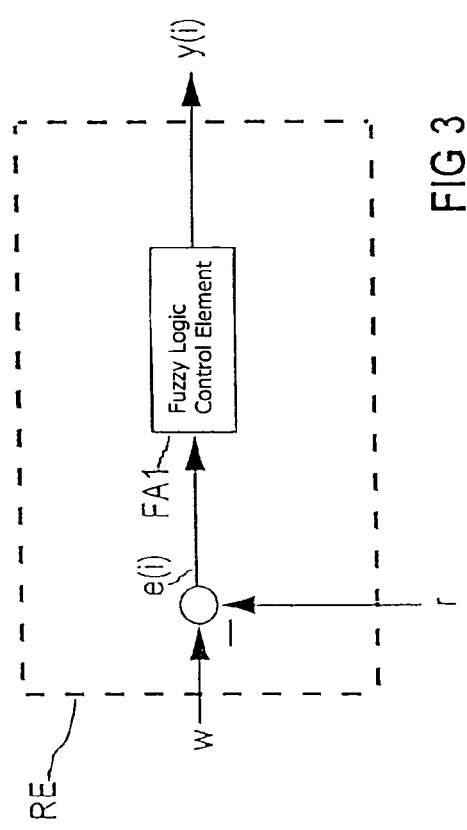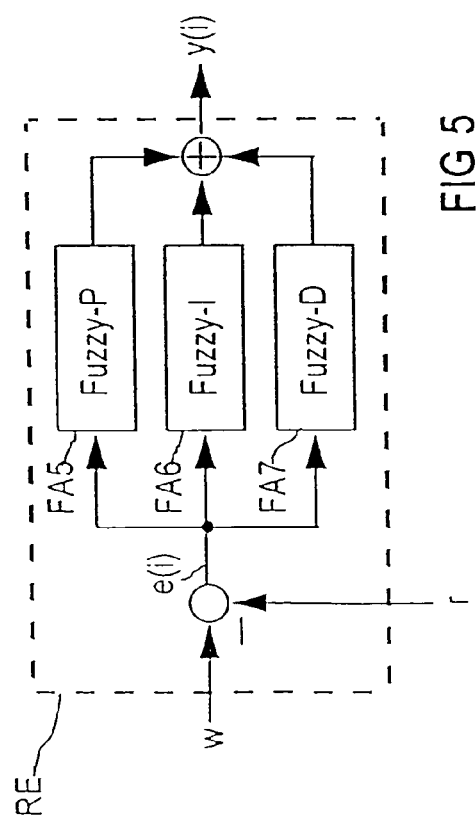

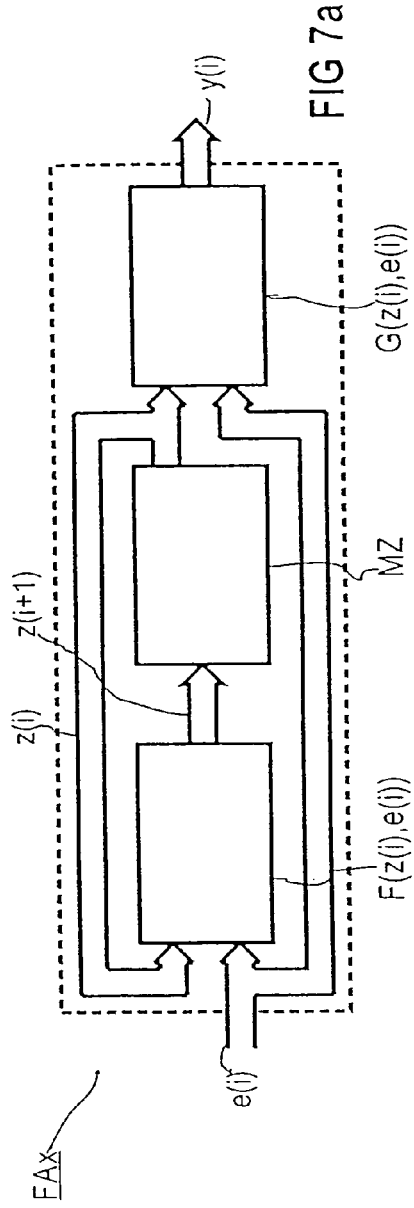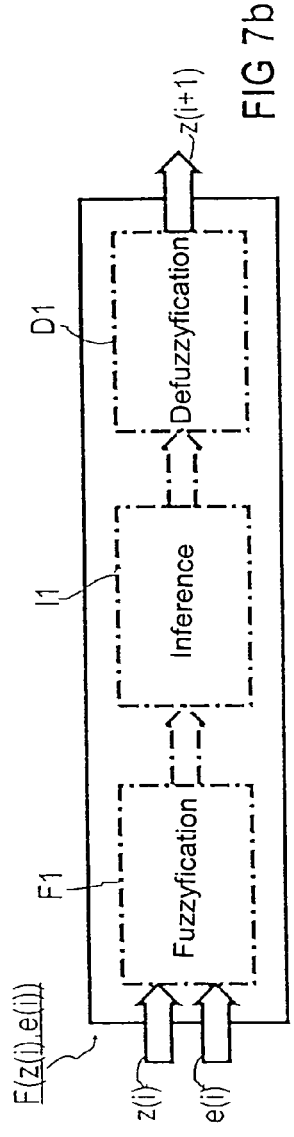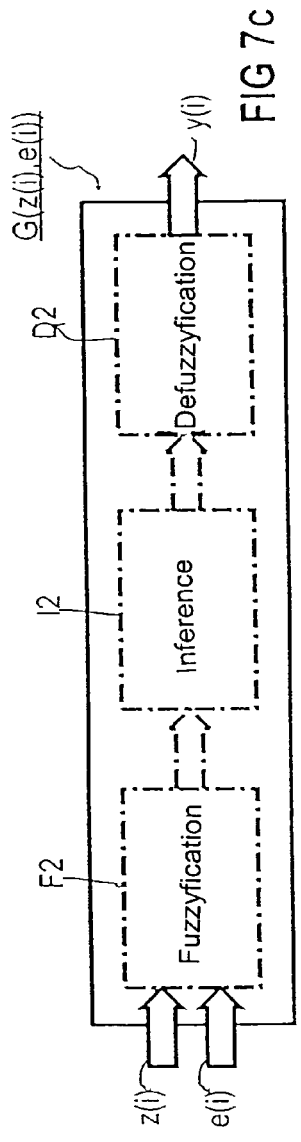

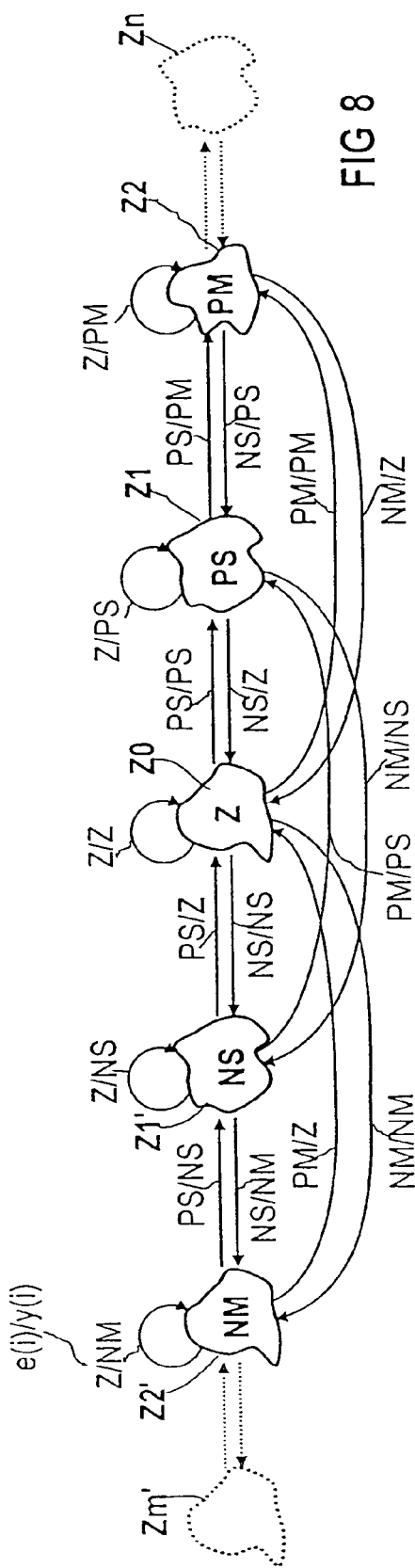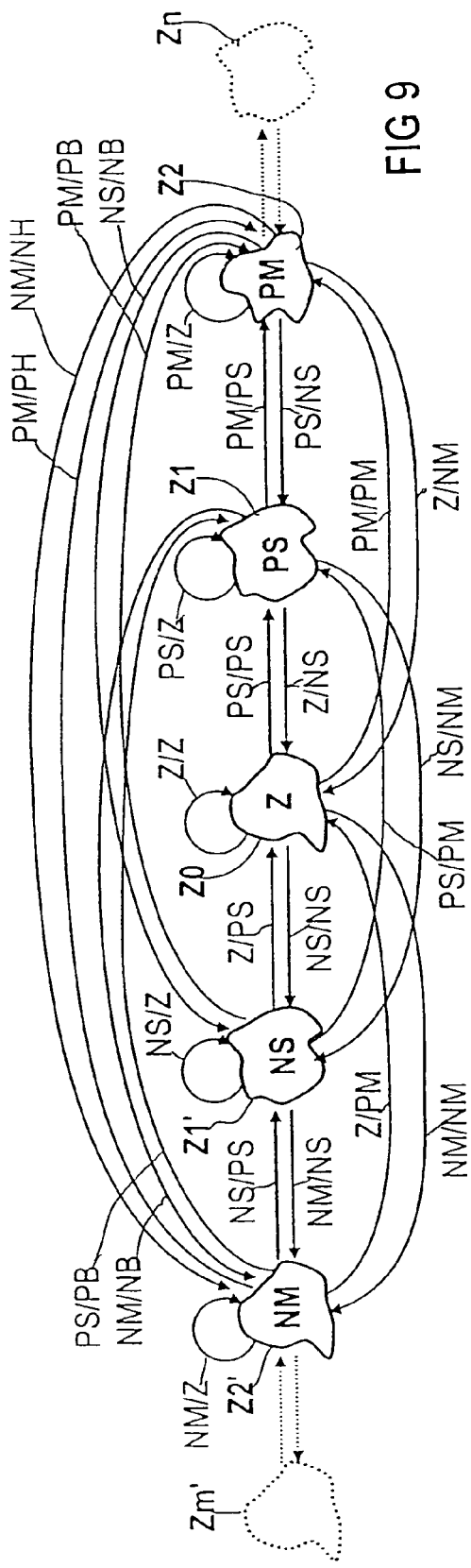

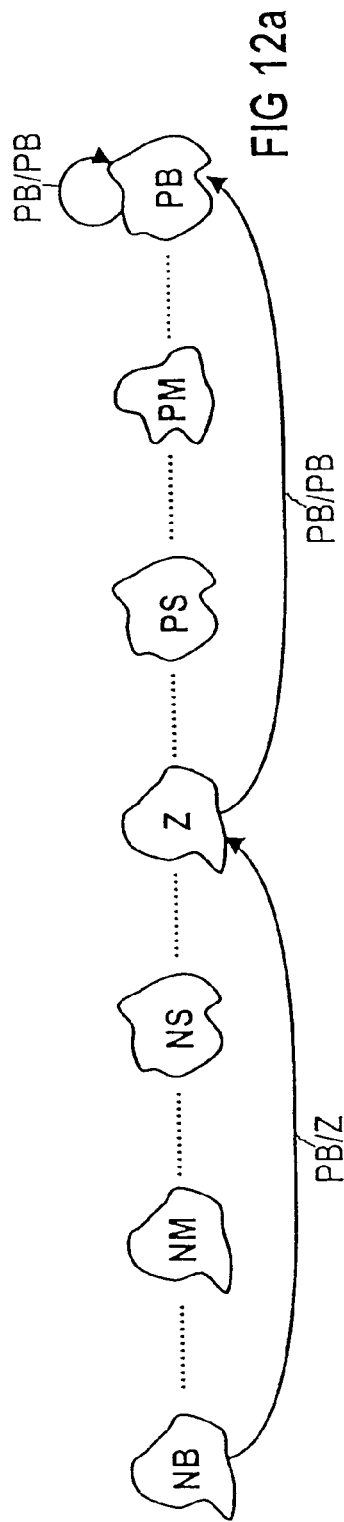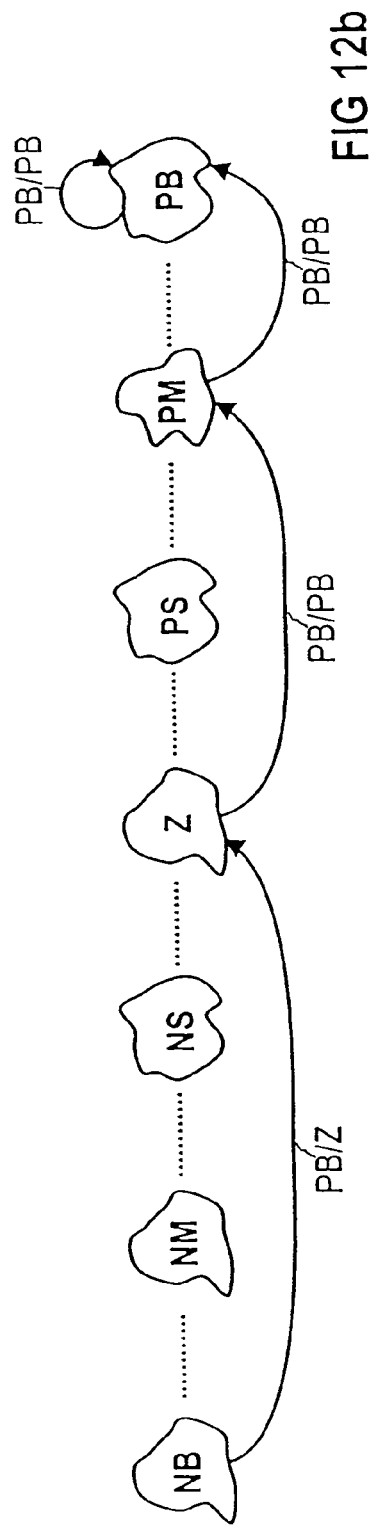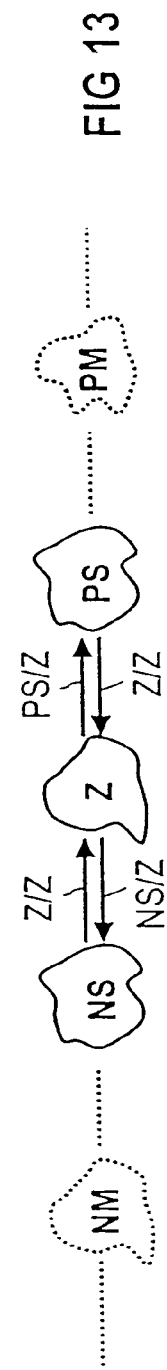

TEMPORALLY DISCRETE DYNAMIC FUZZY LOGIC CONTROL ELEMENTS

BACKGROUND OF THE INVENTION

In conventional control units, fuzzy logic systems used as a control element are static systems, and as such they lack dynamic transfer properties. Accordingly they have the properties of nonlinear, static transfer elements.

To achieve dynamic control properties of a fuzzy logic control unit, it is known to combine static fuzzy logic systems with conventional, linear dynamic control elements. Such linear dynamic control elements have in particular an integrating, differentiating or proportional transfer characteristic arbitrary combinations thereof. For instance, such linear dynamic control elements are also known as I, D, P, PI, PD or PID control elements.

As shown in FIGS. 1 and 2, in a control unit RE' it is known for linear dynamic control elements with an integrating, differentiating and/or proportional transfer characteristic either to precede a static fuzzy logic system control element FU, as shown in FIG. 1, or to follow such a control element FU, as shown in FIG. 2. In FIGS. 1 and 2, in each case as examples, a linear dynamic control element R1' with a proportional transfer characteristic, a linear dynamic control element R2' with an integrating transfer characteristic, and a linear dynamic control element R3' with a differentiating transfer characteristic are shown. The known control units RE' with fuzzy logic properties shown in FIGS. 1 and 2, because of the linear dynamic control elements R1' through R3', in particular have the dynamic properties of a so-called PID controller.

From *Fuzzy-Control* by Mario Koch and others, R. Oldenbourg Verlag GmbH, Munich, 1996, pages 29–32 and 249–266, it is known, for generating dynamic transfer properties, for a control unit with integrating and/or differentiating transfer properties to be preceded or followed by a fuzzy logic system.

The known control units RE', shown as examples in FIGS. 1 and 2, as a rule have a guide variable w', in particular for specifying a desired control value, and a feedback variable r'. The feedback variable r' is subtracted in the control unit RE' from the guide variable w' and supplied as a controlled difference e'=w'−r' to the control elements R1' through R3', or to the fuzzy logic system control element FU. The output variables thereof, that is, of the control elements R1' through R3' or of the fuzzy logic system control element FU, are combined in the control unit RE' and serve as an output variable y' of the control unit RE', in particular for regulating a technical process from which the feedback variable r' is fed back, in particular as a so-called actual control value, to the control unit RE'.

It is disadvantageous that the conventional control units with fuzzy properties are based on the combination of two different systems, mainly static fuzzy logic devices with linear dynamic control element systems. It is especially disadvantageous that the intended introduction of nonlinearities is not possible at all, or at least not without major effort and expense, since in particular this requires knowledge of performance graph regulation or other additional skills. Varying and modifying the controlled properties is thus very complicated or entirely unfeasible. Furthermore, this makes certain desired control unit properties in control technology, such as in particular a nonlinear, limited integration control characteristic, such as the so-called "anti-wind-up" control characteristic, unfeasible.

From International Patent Reference WO 96/31304 and from "Breakout Prediction for Continuous Casting by Fuzzy Mealy Automata", by J. Adamy, Proceedings of the 3rd European Congress of Intelligent Techniques and Soft Computing EUFIT, Aachen, Aug. 29–31, 1995, pages 754–759, a dynamic fuzzy system known as a fuzzy automaton is known for early breakout prediction in continuous casting.

From U.S. Pat. No. 3,272,621, a method and an apparatus for controlling a process involving idle time is known. The method comprises an evaluation of input signals in such a way that process output responses are set in relation to known input information. The input evaluation criteria are represented in one or more of the integrator, proportional and differential process responses.

From German patent disclosure DE 44 20 800 A1, a fuzzy PID controller is known in which, to shorten the calculation time needed to ascertain the controlling variable, the control quantity is minimized to two rules by limiting the relationship functions uses; the fuzzifications are freely selectable as differential and defuzzification methods.

SUMMARY OF THE INVENTION

The object of the invention is to improve a control unit with fuzzy properties in such a way that the control procedures, in particular the integration and differentiation procedures, can be varied and modified more simply.

This object is attained with the control unit according to the invention as defined by A control unit having at least one control element, in particular having at least one integrating transfer characteristic and/or differentiating transfer characteristic, characterized in that the control element is constructed as a temporally discrete dynamic fuzzy logic control element, which has a memory device for buffer storage of a current internal state variable on the basis of fuzzy logic conclusions.

It is an advantage of the control unit of the invention that the properties of static fuzzy logic devices and conventional linear dynamic control elements are combined in the form of temporally discrete dynamic fuzzy logic control elements. Thus the control unit can advantageously be constructed solely with control elements that each systematically have dynamic fuzzy properties.

It is also advantageous that the control unit of the invention can be programmed and parametrized entirely using standard fuzzy control unit software. For instance, the control unit of the invention can thus advantageously be used in either software or hardware form or both.

It is especially advantageous that the transfer properties of the fuzzy logic control elements can be modified in a targeted and clearly understood way. Based on fuzzy logic control elements with an initially in particular virtually linear control unit characteristic, desired control unit nonlinearities can advantageously be introduced in a targeted way. For instance, in the simplest way, in the control unit of the invention a certain control unit characteristic can be implemented that is definable in a targeted way, or in other words "designable", in particular by linguistic rules that are present in the fuzzy logic control elements, or in other words the fuzzy rules of the fuzzy logic conclusions.

Advantageously, the temporally discrete dynamic fuzzy logic control elements of the control unit of the invention are in particular in the form of so-called fuzzy automatons, or automata. These automatons have internal state variables that are updated on the basis of fuzzy logic conclusions. The output variable is also generated on the basis of fuzzy logic conclusions, in such a way that the fuzzy logic control element has the intended transfer characteristic, in particular at least an integrating and/or a differentiating transfer characteristic.

A further advantage is that internal state variables of the fuzzy logic control elements of the control unit of the invention are formed in particular by a succession of internal processing states, and when the internal state variable is updated, the fuzzy logic control element changes over from a former processing state into a subsequent processing state in a temporally discrete manner. The state variables are advantageously capable of being displayed in a clear way using a state graph.

The control unit of the invention is advantageously used to regulate a technical process.

BRIEF DESCRIPTION OF THE DRAWINGS

The invention will also be explained further in terms of the exemplary embodiments shown in the drawings briefly listed below, some of them already having been explained above. Shown as examples are:

FIG. 3, a control unit of the invention with a temporally discrete dynamic fuzzy logic control element;

FIG. 4, a control unit of the invention, with three parallel-connected temporally discrete dynamic fuzzy logic control elements;

FIG. 5, a preferred embodiment of the control unit of the invention shown in FIG. 4, forming a so-called PID controller, which has a proportional-differential-integral transfer characteristic;

FIG. 6, an embodiment of the control unit of the invention shown in FIG. 5, in which the fuzzy logic control elements are combined into a fuzzy logic control element with an integrating and differentiating transfer characteristic;

FIG. 7a, the internal structure of a general embodiment of a temporally discrete dynamic fuzzy logic control element which has a first and second static fuzzy logic device and a memory device for the internal state variable;

FIG. 7b, the internal structure of a preferred embodiment of the first static fuzzy logic device of a temporally discrete dynamic fuzzy logic control element;

FIG. 7c, the internal structure of a preferred embodiment of the second static fuzzy logic device of a temporally discrete dynamic fuzzy logic control element;

FIG. 8, a state graph of a temporally discrete dynamic fuzzy logic control element with an integrating transfer characteristic;

FIG. 9, a state graph of a temporally discrete dynamic fuzzy logic control element with a differentiating transfer characteristic;

FIG. 12a, a state graph of a first temporally discrete dynamic fuzzy logic control element with an integrating transfer characteristic, which is modified as a so-called "anti-wind-up" control element by the targeted introduction of nonlinearities;

FIG. 12b, a state graph of a first fuzzy logic control element modified as a so-called "anti-wind-up" control element; and FIG. 13, a state graph of a temporally discrete dynamic fuzzy logic control element with a differentiating transfer characteristic, in which in the processing state Z, small input variables do not act on the output variable.

DETAILED DESCRIPTION OF THE INVENTION

Figure 1:
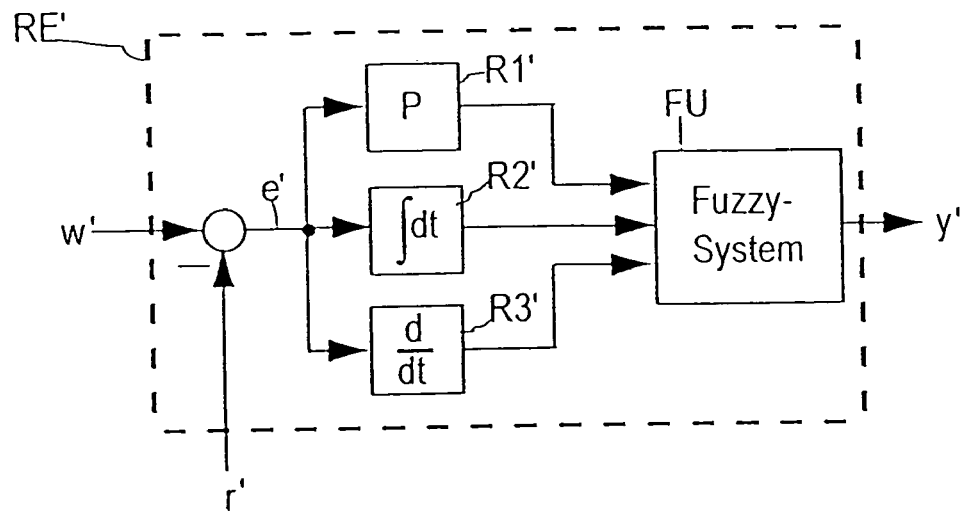
FIG. 1, a known control unit with fuzzy properties, which has a conventional static fuzzy system preceded by three linear dynamic control elements with an integrating, differentiating and proportional transfer characteristic, respectively.
Figure 2:
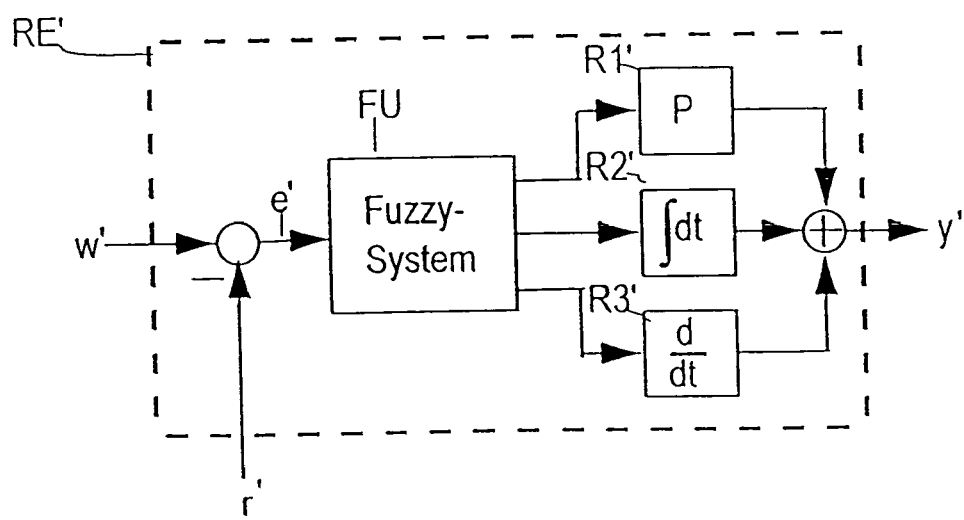
FIG. 2, an embodiment of the known control unit, already shown in FIG. 1, with linear dynamic control elements following the conventional static fuzzy system.

In FIG. 3, the structure of a control unit RE according to the invention having at least one control element FA1 is shown as an example. In particular, the control element FA1 has at least an integrating and/or differentiating transfer characteristic. According to the invention, the control element FA1 is constructed as a temporally discrete dynamic fuzzy logic control element. The control unit RE of the invention is not limited to a single temporally discrete dynamic fuzzy logic control element but instead can have arbitrary interconnections of a plurality of fuzzy logic control elements. In particular, the control unit RE of the invention can additionally have a combination of temporally discrete dynamic fuzzy logic control elements with conventional linear dynamic control elements.

As shown in FIG. 4, the control unit RE of the invention in particular also has a plurality of temporally discrete dynamic fuzzy logic control elements, for instance three parallel-connected temporally discrete dynamic fuzzy logic control elements FA2, FA3 and FA4. Advantageously, the complete transfer characteristic is distributed among the individual fuzzy logic control elements FA2 through FA4, and each fuzzy logic control element FA2 through FA4 effects a certain component of the total transfer characteristic.

In FIG. 5, a preferred embodiment of the control unit RE of the invention is shown which for example, because of the three parallel-connected temporally discrete dynamic fuzzy logic control elements FA5, FA6 and FA7, has a proportional-integral-differential transfer characteristic. For instance, the fuzzy logic control element FA5 has a proportional transfer characteristic, the fuzzy logic control element FA6 an integral transfer characteristic, and the fuzzy logic control element FA7 a differential transfer characteristic. The control unit RE shown in FIG. 5 is thus equivalent to a so-called PID controller with fuzzy properties.

In FIG. 6, again as an example, a control unit RE according to the invention is shown with a temporally discrete dynamic fuzzy logic control element FA8 which has a proportional-integral transfer characteristic. The control unit RE shown in FIG. 6 is thus equivalent to a so-called PI controller with fuzzy properties.

The control unit RE of the invention shown in FIGS. 3 through 6, with its embodiments shown as examples, are supplied in particular with a guide variable w, also known as a desired control value, and a feedback variable r, also known as an actual control value. The control difference, formed of the guide variable w and feedback variable r, is delivered to the temporally discrete dynamic fuzzy logic control elements FA1, FA2 through FA4, FA5 through FA7, and FA8 as an input variable $e(i)=w-r$. The outputs of the various fuzzy logic control elements FA1, FA2 through FA4, FA5 through FA7, and FA8 are in particular combined in the control unit RE into the output variable $y(i)$, for instance by means of direct addition or by means of a weighted addition.

In FIG. 7a, by way of example, the internal structure of a temporally discrete dynamic fuzzy logic control element FAx is shown, which describes a general embodiment of the fuzzy logic control elements FA1, FA2 through FA4, FA5 through FA7, and FA8 shown in FIGS. 3 through 6. The fuzzy logic control element FAx, in terms of FIGS. 3 through 6, has the input variable $e(i)$ and the output variable $y(i)$. The input variable and output variable $e(i)$ and $y(i)$, respectively, can in particular be vector variables; that is, the input variable and output variable $e(i)$ and $y(i)$ can also be in the form of a plurality of input and output values, respectively. In a preferred embodiment of the invention, from the input variable $e(i)$ and an internal state variable $z(i)$, the fuzzy logic control element on the basis of fuzzy logic conclusions updates the internal state variable $z(i)$ in such a way that the fuzzy logic control element FAx has at least an integrating and/or a differentiating, and in particular a nonlinear transfer characteristic. The current state variable $z(i)$ can in particular be a vector variable.

For updating the internal state variable $z(i)$ of the fuzzy logic control element FAx on the basis of fuzzy logic conclusions, the fuzzy logic control element FAx of the control unit RE of the invention preferably has at least one first static fuzzy logic device $F(z(i), e(i))$. This device, from the input variable $e(i)$ and the current internal state variable $z(i)$, generates the internal state variable chronologically following the current internal state variable, that is, $z(i+1)$. The fuzzy logic control element FAx changes over in temporally discrete fashion from the current internal state variable $z(i)$ into the following internal state variable $z(i+1)$. For example, there is a clock rate, specified by a clock signal, at which rate the fuzzy logic control element FAx updates the internal state variable $z(i)$.

The fuzzy logic control element FAx additionally also preferably has at least one second static fuzzy logic device $G(z(i), e(i))$, in order to generate the output variable $y(i)$ of the fuzzy logic control element FAx on the basis of fuzzy deduction. From the input variable $e(i)$ and the current internal state variable $z(i)$, this second static fuzzy logic device generates the current output variable $y(i)$. If the first and second fuzzy devices $F(z(i), e(i))$ and $G(z(i), e(i))$ are functionally identical, for instance if the internal state variable $z(i)$ is intended to have the same value as the output variable $y(i)$, then the second fuzzy device $G(z(i), e(i))$ is unnecessary.

In particular, the fuzzy logic control element FAx shown in FIG. 7a has a memory device MZ for buffer storage of the current internal state variable $z(i)$. By means of the memory device MZ, the current internal state variable $z(i)$ is stored in memory, and in temporally discrete fashion, the subsequent internal state variable $z(i+1)$ is adopted from the first static fuzzy logic device $F(z(i), e(i))$.

In FIGS. 7b and 7c, by way of example, the first static fuzzy logic device $F(z(i), e(i))$ and the second static fuzzy logic device $G(z(i), e(i))$ are shown. The static fuzzy logic devices $F(z(i), e(i))$ and $G(z(i), e(i))$ are in particular called static because chronologically older values are not taken into account in the generation of new values. By way of a fuzzification unit F1 and F2, on which the first and second fuzzy devices $F(z(i), e(i))$ and $G(z(i), e(i))$ are as a rule based, and an inference unit 11 and 12 and a defuzzification unit D1 and D2, the next internal state variable $z(i+1)$ and the output variable $y(i)$, respectively, are generated on the basis of fuzzy logic conclusions.

By means of the temporally discrete adoption of the next internal state variable $z(i+1)$, for instance by means of the memory device MZ of the dynamic fuzzy logic control element FAx, the first and second static fuzzy logic devices $F(z(i), e(i))$ and $G(z(i), e(i))$ are supplied with the new internal state variable $z(i+1)$ as the now-current internal state variable $z(i)$. A fuzzy logic control element FAx constructed in this way is known in particular as a fuzzy automaton.

In FIGS. 8 and 9, two temporally discrete dynamic fuzzy logic control elements FAx are described as examples in terms of processing states Zm' through Zn that can be assumed by the corresponding state variable $z(i)$. This further embodiment of the invention is illustrated in terms of state graphs of the temporally discrete dynamic fuzzy logic control element FAx. The state graph shown in FIG. 8 describes a fuzzy logic control element FAx with an integrating transfer characteristic, and the state graph shown in FIG. 9 describes a fuzzy logic control element FAx with a differentiating transfer characteristic. In accordance with the advantageous embodiment of the invention, the internal state variable $z(i)$ of the fuzzy logic control element FAx is formed by at least one succession of processing states Zm' through Z1', Z0, Z1 through Zn; upon an updating of the internal state variable $z(i)$ on the basis of fuzzy logic conclusions, the fuzzy logic control element FAx changes over from a previous processing state into a subsequent processing state in temporally discrete fashion.

The examples shown in FIGS. 8 and 9 of preferred embodiments of the invention are limited by way of example to the five processing states Z2' through Z2 shown in heavy lines in each case. The number of processing states is naturally not limited to those in the examples described; instead, they can be expanded arbitrarily in both directions, as indicated by way of example by the processing states Zm' and Zn' shown in dashed lines.

A particular significance is assigned to each of the processing states Z2' through Z2, such as NM for medium negative values, NS for low negative values, Z for values which are approximately 0, PS for low positive values, or PM for medium positive values. The arrows in the state graphs indicate the change from a current processing state of the fuzzy logic control element FAx to a subsequent processing state. Reference symbols that indicate the input variable $e(i)$ and the output variable $y(i)$ are associated with the arrows. The significances of the processing states Z2' through Z2 serve in particular also as fuzzy values for the input and output variables $e(i)$ and $y(i)$, respectively, of the fuzzy logic control element FAx. The designations are made in the form of input variable/output variable $e(i)/y(i)$. The significances assigned to the input variable and output variable $e(i)$ and $y(i)$ can, however, also be independent of one another and independent of the significances assigned to the processing states.

The arrows, shown in the state graphs, for describing the possible transitions between the processing states Z2' through Z2 and the corresponding output variables $y(i)$ for certain input variables $e(i)$, serve in particular for the derivation of fuzzy logic conclusions for the fuzzy logic control element FAx. On the basis of these fuzzy logic conclusions, the internal state variable $z(i)$ and the output variable $y(i)$ are updated and generated, in particular by the first static fuzzy logic device $F(z(i), e(i))$ and the second static fuzzy logic device $G(z(i), e(i))$, respectively, in accordance with the state graph shown for example in FIG. 7b and FIG. 7c, respectively. Two fuzzy logic conclusions can be given as examples: IF current processing state PS AND input variable of low positive value PS, THEN following processing state PM and output variable of medium positive value PM.

In the exemplary state graphs of FIGS. 8 and 9, the rules, that is, the fuzzy logic conclusions in particular, with which the fuzzy logic control element FAx, in an advantageous embodiment, updates the processing state Z2' through Z2 from the input variable e(i) and from the processing state Z2' through Z2, and generates the output variable y(i) in such a way that the fuzzy logic control element FAx has at least an integrating or a differentiating transfer characteristic, respectively, are shown.

Given a suitable choice of the relationship functions and the influential variable on which the fuzzy logic conclusions are based, the advantageous embodiments shown here are initially based only on a linear or at least nearly linear transfer characteristic of the fuzzy logic control element FAx. This transfer characteristic represents an advantageous initial basis for modifications, for instance in the form of the targeted introduction of nonlinearities.

The state graph shown in FIG. 8 for a fuzzy logic control element FAx has rules for fuzzy logic conclusions that bring about an integrating transfer characteristic of the fuzzy logic control element FAx. Advantageously, the output variable y(i) and the updated internal state variable z(i+1), that is, the subsequent processing state Z2' through Z2, have the same value NM, NS, Z, PS, or PM.

For instance in the case of input variables e(i) that have nearly the value Z, the fuzzy logic control element FAx remains in the previous processing state Z2' through Z2. At low positive values PS of the input variable e(i), the fuzzy logic control element FAx changes over into the next higher processing state, that is, for instance from PS to PM. At low negative values NS of the input variable e(i), the fuzzy logic control element FAx changes over into the next lower processing state, that is, for instance from PS to Z. At medium positive values PM of the input variable e(i), the fuzzy logic control element FAx changes over in particular to the second from the next higher processing state, that is, from Z to PM, for instance. At medium negative values NM of the input variable e(i), the fuzzy logic control element FAx changes over in particular to the second from the next lower processing state, that is, for instance from Z to NM.

The state graph shown in FIG. 9 of a fuzzy logic control element FAx has rules for fuzzy logic conclusions that cause a differentiating transfer characteristic of the fuzzy logic control element FAx. Advantageously, the updated or in other words subsequent processing state Z2' through Z2 has the same value NM through PM as the input variable e(i), so that a storage of the input variable in memory is effected. The updated internal state variable z(i+), that is, in particular the subsequent processing state, is thus dependent in particular only on the input variable e(i), but not on the current processing state Z2' through Z2, that is, the processing state at that time.

For example with input variables e(i) that have the value Z, the fuzzy logic control element FAx changes over to the processing state Z0, which is assigned the significance Z. The output variable y(i) is obtained from the current input variable e(i) and the value of the previous input variable, that is, the current processing state Z2' through Z2. Based on the current processing state Z1', for instance, which is assigned the value NS, an input variable e(i) of the value Z produces the subsequent processing state Z0, which is assigned the value Z, and an output variable y(i) of low positive value PS. In the example of FIG. 9, still other values are listed, in particular for the output variable y(i), such as PB and NB for high positive and negative values, respectively, and PH and NH for very high positive and negative values, respectively.

Since the examples shown in FIGS. 8 and 9 are state graphs with a limited number of processing states Z2' through Z2, an uppermost processing state Z2 and a lowermost processing state Z2' are respectively present. The processing states Z2' through Z2 that can be assumed by the fuzzy logic control element FAx and the output variable y(i) are thus limited to a highest and lowest value, respectively, in this case PM and NM. However, an endless or half-open succession of processing states ZM' through ZN, in other words without any limitation of their number, can also be made the basis for the fuzzy logic control element FAx.

Figure 10:
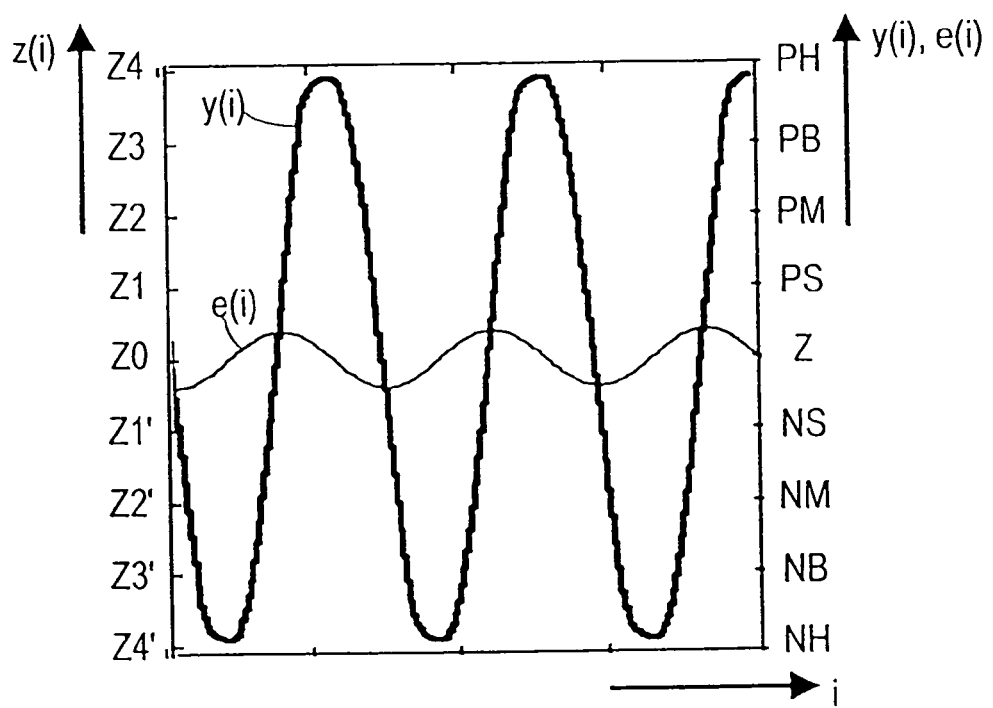
FIG. 10, a graph as an example for illustrating the input variable and output variable of the temporally discrete dynamic fuzzy logic control element, shown in FIG. 8, with an integrating transfer characteristic for the special case of a linearly designed transfer characteristic.
Figure 11:
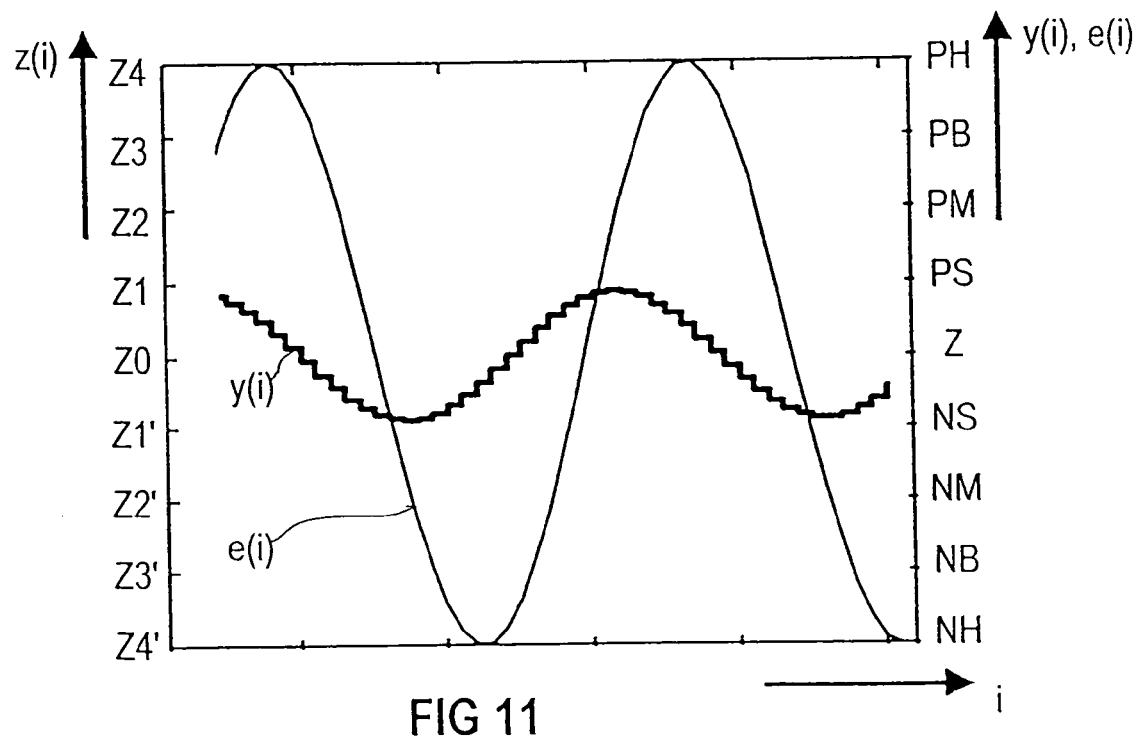
FIG. 11, a graph as an example for illustrating the input variable and output variable of the temporally discrete dynamic fuzzy logic control element, shown in FIG. 9, with a differentiating transfer characteristic for the special case of a linearly designed transfer characteristic.

In FIGS. 10 and 11, with reference to the exemplary embodiments of the invention shown in FIGS. 8 and 9 with an integrating and differentiating transfer characteristic, respectively, a respective graph is shown to illustrate the input variable and output variable e(i) and y(i), respectively, of the corresponding temporally discrete dynamic fuzzy logic control element FAx. Here the respective fuzzy logic control element FAx initially has a virtually linear transfer characteristic. This virtually linear transfer characteristic can be varied in targeted fashion by retroactively introducing nonlinearities, in order to obtain a desired control behavior. The thin solid lines in FIGS. 10 and 11 represent the corresponding input variable e(i), which here has a sinusoidal course, for example. The curves shown in heavy solid lines represent the corresponding output variable y(i), which is the integral and derivation function, respectively, of the corresponding input variable e(i). Since the dynamic fuzzy logic control element FAx of the invention is temporally discrete, the output variable y(i) has a stairstep-like course. The size of the steps can be varied in particular by means of the sampling rate, that is, the clock rate, at which the temporally discrete dynamic fuzzy logic control element FAx updates the internal state variable z(i).

FIGS. 12a, 12b and 13 by way of example show how a control unit RE of the invention can be advantageously modified by the targeted introduction of nonlinearities. Modifying the rules, that is, the fuzzy logic conclusions, can be done in particular by modifying the arrows and the associated output variable y(i) in the state graph. For the sake of simplicity, FIGS. 12a, 12b and 13 are incomplete; that is, in particular, not all the transitions between the processing states Z2' through Z2 are shown, and these drawings serve solely to illustrate principles of modification, which can be adopted in particular for the exemplary embodiments of FIGS. 8 and 9.

The exemplary embodiments shown in FIGS. 12a and 12b pertain to the state graphs of two temporally discrete dynamic fuzzy logic control elements FAx with an integrating transfer characteristic, which are modified as so-called "anti-wind-up" control elements. The fuzzy logic control elements FAx are limited to a finite or in other words limited number of processing states, in this case as an example the five processing states Z2' through Z2; as a result, the outer processing states Z2' and Z2 cannot be undershot or exceeded. The fuzzy logic control element FAx, in the example of FIG. 12a, remains in the highest processing state PB, even if a high positive value PB that otherwise causes three states to be skipped over is entered as an input variable. In the example of FIG. 12b, the skip width accomplished in updating the processing state, assuming the saturation processing state PB is even additionally reduced from a skip width of three, that is, NB to Z, by way of two, that is, Z to PM, and one, that is, PM to PB, down to zero, that is, PB to PB, even though a high-value PB is present in each case as the input variable.

The exemplary embodiment shown in FIG. 13 pertains to the state graph of a temporally discrete dynamic fuzzy logic control element FAx, with a modified differentiating transfer characteristic. Low positive and negative values PS and NS of the input variable then do cause a transition of the fuzzy logic control element FAx from the processing state Z to the corresponding subsequent processing state, for instance from Z to PS or from Z to NS or vice versa, but the output variable for low values is reduced in particular to the value Z, or in other words zero. As a result, in particular, the damping of noise and interference signals in the input variable is brought about.

What is claimed is:

1. A control unit comprising:
a temporally discrete dynamic fuzzy logic control element having at least one integrating transfer characteristic and/or differentiating transfer characteristic and comprising a memory device to store a current internal state variable of said fuzzy logic control element, said current internal state variable based on fuzzy logic conclusions.

2. A control unit as in claim 1, wherein said fuzzy logic control element updates the current internal state variable based on an input variable and the current internal state variable and generates an output variable such that said fuzzy logic control element has at least one integrating transfer characteristic and/or differentiating transfer characteristic.

3. A control unit as in claim 1, wherein said fuzzy logic control element further comprises at least one first static fuzzy logic device to update the current internal state variable of the fuzzy logic control element based on fuzzy logic conclusions.

4. A control unit as in claim 1, wherein said fuzzy logic control element further comprises at least one second static fuzzy logic device to update an output variable of the fuzzy logic control element based on fuzzy logic conclusions.

5. A control unit as in claim 1, wherein said current internal state variable of said fuzzy logic control element is based on a processing state in at least one succession of processing states, and wherein said fuzzy logic control element changes from one processing state to another processing state in temporally discrete fashion upon updating of said current internal state variable.

6. A method of regulating a technical process comprising utilizing the control unit of claim 1.

7. A control unit comprising:
means for combining a guide variable and a feedback variable to obtain an input variable; and
a fuzzy logic control element comprising:
a first fuzzy logic device receiving said input variable from said means for combining and a current internal state variable of said fuzzy logic control element and generating a next internal state variable of said fuzzy logic control element on a temporally discrete basis based on fuzzy logic and at least one integrating transfer characteristic and/or differentiating transfer characteristic; and
a memory device receiving said next internal state variable of said fuzzy logic control element from said first fuzzy logic device and providing said current internal state variable of said fuzzy logic control element to said first fuzzy logic device.

8. A control unit as in claim 7, wherein said first fuzzy logic device comprises processing states identifying a transition from said current internal state variable to said next internal state variable, wherein said transition is based on fuzzy logic conclusions and occurs on a temporally discrete basis, wherein said current internal state variable corresponds to one of said processing states, wherein said next internal state variable corresponds to said one or another of said processing states.

9. A control unit as in claim 7, wherein fuzzy logic control element further comprises:
a second fuzzy logic device receiving said input variable from said means for combining and said current internal state variable of said fuzzy logic control element from said memory device and generating an output variable for said control unit based on fuzzy logic and at least one integrating transfer characteristic and/or differentiating transfer characteristic.

10. A method for controlling comprising the steps of:
receiving a guide variable;
receiving a feedback variable;
combining said guide variable and said feedback variable to obtain an input variable; generating a next internal state variable on a temporally discrete basis based on said input variable, a current internal state variable, fuzzy logic, and at least one integrating transfer characteristic and/or differentiating transfer characteristic;
storing said next internal state variable; and
providing said current internal state variable based on stored next internal state variable;
generating an output variable for controlling based on said current internal state variable.

11. A method as in claim 10, wherein the step of generating said next internal state variable is based on processing states identifying a transition from said current internal state variable to said next internal state variable, wherein said transition is based on fuzzy logic conclusions and occurs on a temporally discrete basis, wherein said current internal state variable corresponds to one of said processing states, wherein said next internal state variable corresponds to said one or another of said processing states.

12. A method as in claim 10, wherein the step generating said output variable for controlling is based on said current internal state variable and said input variable.

* * * * *